United States Patent [19]

Saitoh et al.

[11] Patent Number: 4,465,271
[45] Date of Patent: Aug. 14, 1984

[54] ORIGINAL CONVEYING DEVICE FOR A COPYING MACHINE

[75] Inventors: Toshio Saitoh; Susumu Wakatsuki; Heiichiro Kojima; Noboru Asaka, all of Kanagawa, Japan

[73] Assignee: Fuji Xerox Co., Ltd., Tokyo, Japan

[21] Appl. No.: 332,777

[22] Filed: Dec. 21, 1981

[30] Foreign Application Priority Data

Dec. 23, 1980 [JP] Japan .................................. 55-181289

[51] Int. Cl.³ ............................................. B65H 7/14
[52] U.S. Cl. .................................... 271/227; 271/301
[58] Field of Search ............... 271/301, 291, 227, 245; 209/586

[56] References Cited

U.S. PATENT DOCUMENTS 3,770,348 11/1973 Martin ............................. 271/301 X
4,072,305 2/1978 Scheid ............................. 271/301 X
4,326,636 4/1982 Kawakami ...................... 209/586 X

FOREIGN PATENT DOCUMENTS 2348426 9/1973 Fed. Rep. of Germany ...... 271/301

Primary Examiner—Richard A. Schacher
Attorney, Agent, or Firm—Sughrue, Mion, Zinn, Macpeak and Seas

[57] ABSTRACT

A plurality of discrete length paper recirculation paths are connectable in series in accordance with the detected length of an original document, so that the shortest possible recirculation path length is selected to maximize copying speed.

13 Claims, 3 Drawing Figures

ORIGINAL CONVEYING DEVICE FOR A COPYING MACHINE

BACKGROUND OF THE INVENTION

This invention relates to original conveying devices for copying machines, and more particularly to an original conveying device in which the original conveying path length can be adjusted according to the size of an original.

Heretofore, the following types of original conveying devices have been available for copying machines:

(1) An original conveying device in which an original is wrapped around a drum, and the original is conveyed by rotating the drum;

(2) An original conveying device in which an original is conveyed by belts, or by rollers and idlers; and (3) An original conveying device in which vacuum transports are employed to convey an original.

However, these conventional devices are disadvantageous in that, since the original conveying path is fixed so as to be suitable for the length of a largest allowable original, the original processing capability is maintained unchanged irrespective of the size of originals, as a result of which a high speed copying operation cannot be carried out.

SUMMARY OF THE INVENTION

Accordingly, an object of this invention is to provide an original conveying device in which the arrangement is improved to eliminate the above-described difficulties accompanying a conventional original conveying device, and to remarkably improve the capability of processing many originals of different sizes, to thereby permit a high speed copying operation.

The foregoing object of the invention has been achieved by the provision of an original copying machine which is so designed that a plurality of conveying structures having small path lengths are combined into a conveying structure having a large path length, and the conveying structures of small path lengths are then selectively combined according to the sizes of originals.

DETAILED DESCRIPTION OF THE INVENTION

Figure 1:
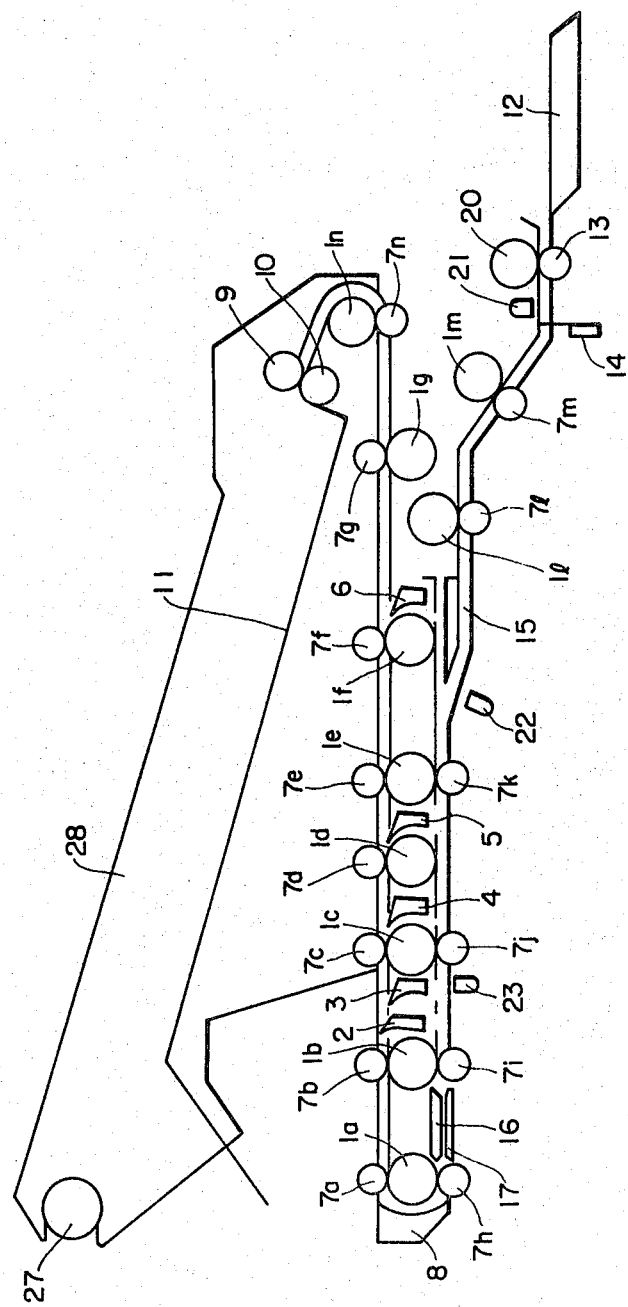
FIG. 1 is a schematic diagram showing one embodiment of this invention.

Preferred embodiments of this invention will now be described with reference to the accompanying drawings. FIG. 1 is an explanatory diagram showing a first embodiment of this invention.

In FIG. 1, reference characters $1a$ through $1n$ designate drive rollers for conveying an original; 2, a first finger for returning to a path towards an exposure position an original whose length is equal to the lateral dimension of sheets having a size defined by "column A" and "No. 4" according to the Japanese Industrial Standard (hereinafter referred to as "A-4", when applicable, and other sizes being referred to as "A-3", "A-2", etc. according to the Japanese Industrial Standard and as is well known in the art) so as to repeatedly copy the original; and 3, a second finger for returning to the path towards the exposure position an original whose length is equal to the longitudinal dimension of the size A-4 sheet, i.e. the lateral dimension of a size A-3 sheet, so as to repeatedly copy the original, similarly as in the above-described case.

Reference numeral 4 designates a third finger for returning to the path towards the exposure position an original whose length is equal to the lateral dimension of a size A-2 sheet, so as to repeatedly copy the original similarly as in the above described case; 5, a fourth finger for returning to the path towards the exposure position an original whose length is equal to the lateral dimension of a size A-1 sheet, so as to repeatedly copy the original similarly; and 6, a fifth finger for returning to the path extended towards the exposure position an original whose length is equal to the longitudinal dimension of the size A-1 sheet, so as to repeatedly copy the original.

Further in FIG. 1, reference characters $7a$ through $7n$ designate idle rollers combined with the drive rollers $1a$ through $1n$ as shown; 8, an original's oblique conveyance correcting finger; 11, an original discharging tray; and 9, a feed-out idler operating in association with a feed-out roller 10 to deliver into the original discharging tray 11 an original which has been copied.

Reference numeral 12 designated an original inserting stand; 20, a feed-in roller operating in association with a feed-in idler 13 to feed an original into the copying machine; 14, a gate; 15, an original standby position; and 16, a platen glass plate.

Reference numeral 21 designates an original width detector constituted by nine photo-sensors arranged in one lateral line or perpendicularly to the direction of movement of an original; 22, a photo-sensor for detecting the presence or absence of an original; 23, an original front edge and inclination detector which is constituted by a plurality of photo-sensors arranged in one lateral line or perpendicularly to the direction of movement of an original; and 27, a shaft about which a frame 28 can be turned to open the original discharging tray and to remove an original when jammed.

With the original conveying machine thus constructed, a high speed copying operation of a variety of originals different in size is carried out as follows:

An original is inserted into the machine from the original inserting stand 12, and the front edge of the original strikes against the gate 14. In this operation, the lateral dimension of the original is detected and stored by the photosensor 21.

About 0.2 to 0.5 seconds, for instance, after the front edge of the original has struck against the gate 14, the solenoid (not shown) of the feed-in roller 20 is excited, as a result of which the original is grabbed by the feed-in roller 20 and the feed-in idler 13. Thereafter, the gate 14 is opened, and the original is inserted into the copying machine by the feed-in roller 20.

The original is conveyed onward by the drive roller $1m$ and the idle roller $7m$ and by the drive roller $1l$ and the idler roller $7l$. The front edge of the original is then detected by the photo-sensor 22 adapted to detect the presence or absence of an original, and the original is stopped at the standby position. The original is moved again later at a copying sheet feeding timing.

The original is conveyed on by the drive rollers $1e$ and $1c$ and the idler rollers $7k$ and $7j$ which are abutted against the former, respectively. This operation continues until the front edge of the original is detected by the original front edge and inclination detector 23, whereupon the detection results of the original width detector 21 and the original presence or absence detector 22 are combined to determine the dimension, in the direction of movement, of the original.

When the dimension in the direction of movement of the original is determined, one of the first through fifth fingers corresponding to the length of the original is released.

Figure 2:
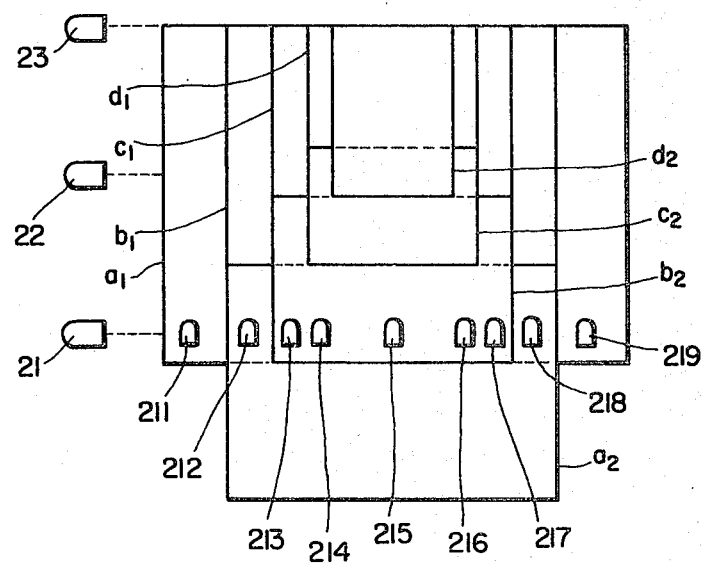
FIG. 2 is an explanatory diagram for a description of a method of measuring the width and length of an original.

A method of detecting a dimension in the direction of movement of an original with the above-described original conveying machine will now be described with reference to the following Table 1 and FIG. 2.

TABLE 1

| 21 | 211 | 0→0 | 1→0 | 1→1 | 1→1 | 1→1 | 1→1 | 1→1 | 1→1 |
|---|---|---|---|---|---|---|---|---|---|
| | 212 | 0→0 | 0→0 | 0→1 | 1→1 | 1→1 | 1→1 | 1→1 | 1→1 |
| | 213 | 0→0 | 0→0 | 0→1 | 0→0 | 0→1 | 1→1 | 1→1 | 1→1 |
| | 214 | 0→0 | 0→0 | 0→1 | 0→0 | 0→1 | 0→1 | 0→1 | 1→1 |
| | 215 | 0→0 | 0→0 | 0→1 | 0→0 | 0→1 | 0→1 | 0→1 | 0→1 |
| | 216 | 0→0 | 0→0 | 0→1 | 0→0 | 0→1 | 0→1 | 0→1 | 1→1 |
| | 217 | 0→0 | 0→0 | 0→1 | 0→0 | 0→1 | 1→1 | 1→1 | 1→1 |
| | 218 | 0→0 | 0→0 | 0→1 | 1→1 | 1→1 | 1→1 | 1→1 | 1→1 |
| | 219 | 0→0 | 1→0 | 1→1 | 1→1 | 1→1 | 1→1 | 1→1 | 1→1 |
| 22 | | 0 | 0 | 0 | 0 | 0 | 0 | 1 | 0 |
| 23 | | 0 | 0 | 0 | 0 | 0 | 0 | 0 | 0 |
| Original Size | | A-1 | A-1 | A-2 | A-2 | A-3 | A-3 | A-4 | A-4 |
| Original Orientation | | LAT (a1) | LON (a2) | LAT (b1) | LON (b2) | LAT (c1) | LON (c2) | LAT (d1) | LON (d2) |
| Finger | | 5 | 6 | 4 | 5 | 3 | 4 | 2 | 3 |

*LAT = Lateral
LON = Longitudinal

In Table 1 and FIG. 2, those components which have been previously described with reference to FIG. 1 are therefore similarly numbered or designated by like reference numerals or characters. Reference numerals 211 through 219 designate the photo-sensors forming the original width detector 21, and "0" indicates the case where an original is detected by these photo-sensors, while "1" indicates the case where an original is not detected by the photo-sensors.

Symbol a1 designates a size A-1 sheet which is stopped laterally at the original front edge and inclination detector 23; a2, size A-1 sheet which is stopped longitudinally at the detector 23; b1, a size A-2 which is stopped laterally at the detector 23, b2, a size A-2 sheet which is stopped longitudinally at the detector 23, c1, a size A-3 sheet which is stopped laterally at the detector 23; c2, a size A-3 sheet which is stopped longitudinally at the detector 23; d1, a size A-4 sheet which is stopped laterally at the detector 23; and d2, a size A-4 sheet which is stopped longitudinally at the detector 23.

As is apparent from the figures, the width of an original is detected by the original width detector 21, and the length of the original is detected by the original front edge and inclination detector 23, the original presence or absence detector 22 and the original width detector 21. Therefore, the size of the original can be determined from the width and length thus detected.

For instance, in the case where first the front edge of an original is detected by all the photo-sensors 211 through 219 of the detector 21 (Table 1), and when the front edge of the original conveyed reaches the detector 23, the middle portion of the original is detected by the photo-sensors 22, while the rear edge of the original are still detected by all the photo-sensors 211 through 219, it can be determined that the original is of size A-1 and is laid laterally (a1). Therefore, in this case, the fourth finger 5 is released.

In the case where first the front edge of an original is detected by the photo-sensors 212 through 218 only as indicated in Table 1, and when the front edge of the original conveyed reaches the detector 23, the middle portion of the original is detected by the photo-sensor 22, while the rear edge of the original is detected by all of the photo-sensors 212 through 218, it can be determined that the original is of size A-1 and is laid longitudinally (a2). In this case, the fifth finger 6 is released.

In the case where first the front edge of an original is detected by the photo-sensors 212 through 218 only, and when the original is conveyed until the front edge reaches the detector 23, the middle portion of the original is detected by the photo-sensor 22, while the rear edge of the original is not detected by the photo-sensors 211 through 218, it can be determined that the original is of size A-2 and is laid laterally (b1). In this case, the third finger 4 is released.

In the case where first the front edge of an original is detected by the photo-sensors 213 through 217 only, and when the original is conveyed until its front edge reaches the detector 23, the middle portion of the original is detected by the photo-sensor 22 while the rear edge of the original is detected by the photo-sensors 213 through 217 only, it can be determined that the original is of size A-2 and is laid longitudinally (b2). In this case, the fourth finger 5 is released.

In the case where first the front edge of an original is detected by the photo-sensors 213 through 217 only, and when the original is conveyed until the front edge reaches the detector 23, the middle portion of the original is detected by the photo-sensor 22 while the rear edge of the original is not detected by any one of the photo-sensors 211 through 219, it can be determined that the original is of size A-3 and is laid laterally (c1). In this case, the second finger 3 is released.

In the case where first the front edge of an original is detected by the photo-sensors 214 through 216 only, and when the original is conveyed until the front edge reaches the detector 23, the middle portion of the original is detected by the photo-sensor 22 while the rear edge of the original is not detected by any one of the photo-sensors 211 through 219, it can be determined that the original is of the size A-3 and is laid longitudinally (c2). In this case, the third finger 4 is released.

Similarly, in the case where first the front edge of an original is detected by the photo-sensors 214 through 216 only, and when the original is conveyed until the front edge reaches the detector 23, the middle portion of the original is not detected by the photo-sensor 22 while the rear edge of the original is not detected by any one of the photo-sensors 211 through 219, it can be determined that the original is of size A-4 and is laid laterally (d1). In this case, the first finger 2 is released.

Finally, in the case where first the front edge of an original is detected by only one photo-sensor 215, and when the original is conveyed until its front edge reaches the detector 23, the middle portion of the original is detected by the photo-sensor 22 while the rear edge of the original is not detected by any one of the photo-sensors 211 through 219, it can be determined that the original is of size A-4 and is laid laterally (d2). In this case, the second finger 3 is released.

The original front edge and inclination detector 23 operates to detect the front edge of an original as described before and to detect the inclination of an original with plural photo-sensors arranged on a lateral line, or perpendicularly to the direction of movement of an original. The data on the inclination of an original is applied to the original's oblique conveyance correcting unit 8.

In this connection, an inclination correcting data can be calculated as follows: It is assumed that a rectangular original is conveyed with its short side at the top. When the short side, i.e., the front edge, of the original reaches the original front edge and inclination detector 23, the arrival times of both ends are detected by the photo-sensors. If the arrival times of the right and left ends of the front edge are represented by $t_0$ and $t_1$, and the speed of the original being conveyed is represented by $v$, then the time difference is $t_1-t_0$. In this case, the inclination correcting data is $(t_1-t_0)v$.

The original document will be forwarded past the exposure position, and the first exposure may thus have an inclination error if the original is in an inclined position. The document then arrives at the connecting unit 8 which is, e.g., rotatable about a perpendicular axis. In this way, the curved surface of the unit 8 which guides the document can be brought closer at one edge of the document than at the other, thus adjusting the path length on either side of the document to effect inclination correction. After the original once passes the unit 8, the unit 8 is returned to its neutral position, since no more inclination correction will be needed. The original, which is now properly aligned, is fed back to the exposure position and is continually recirculated through the appropriate path length for multiple copying. During this time, the correcting unit 8 remains in its neutral position.

In order to conserve copying paper, the exposure station may, if desired, be disabled during the first pass of a document if an inclination error is detected by the sensors 23, with actual copying commencing only after the document has has passed once by the correcting unit 8.

In this operation, the second original is conveyed similarly as in the first original, and is held at the original standby position 15.

When the number of copies of the first original becomes equal to a value set by a preset counter, the aforementioned finger is operated to close the original circulating path and open the path to the discharge tray. The original whose copying operation has been accomplished, i.e. the first original, is then delivered into the original discharging tray 11 by the feed-out roller 10 and the feed-out idler 9.

At the same time, the second original starts movement, and it is finally delivered to the exposure position similarly as in the case of the first original.

Figure 3:
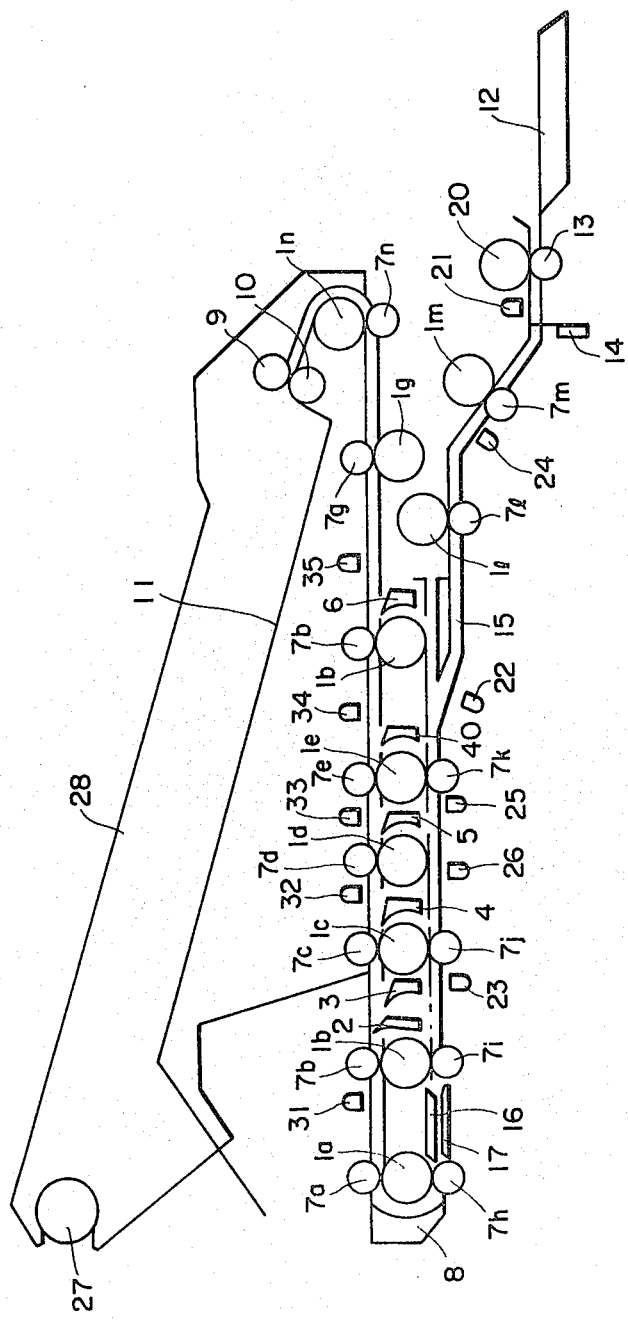
FIG. 3 is a schematic diagram showing another embodiment of the invention.

FIG. 3 shows another embodiment of the invention. In FIGS. 3 and 1, like parts are designated by like reference numerals or characters.

In FIG. 3, reference numerals 24 through 36 designate original presence or absence detecting photo-sensors; 31 through 35, jamming detecting photo-sensors; and 40, a finger.

The second embodiment in FIG. 3 is different from the first embodiment in FIG. 1 in that a number of photo-sensors for detecting the presence or absence of an original are provided so as to detect the lengths of originals the number of possible sizes of which may be more than that in the first embodiment, and the jamming detecting photo-sensors are provided so as to detect the occurrence of jamming. E.g., an appropriate light indicating the jamming location may be lit any time one of the sensors 31 through 35 detects a paper for longer than a predetermined period of time the copying operation.

In the invention, as was described above, a conveying structure having a large path length is formed by using a plurality of conveying structures each of small path lengths, and the conveying structures of small path length are suitably combined separately according to the sizes of originals. Therefore, the original conveying device according to the invention has significant advantages that the capability of processing many originals different in size is remarkably improved, and the copying operation can be carried out at the highest possible speed corresponding to a particular size original.

Even if an original or originals are jammed in the conveying path, the occurrence of jamming is detected by the jamming detecting photo-sensors. The drive rollers are made readily accessible by turning the frame 28 about the shaft 27 so that the jammed original can be readily removed. This is another advantage of the invention.

It is obvious that the positions of the original width detector and the original presence or absence detecting sensor can be exchanged for each other. It is further obvious that different sensor arrays could be employed without departing from the spirit and scope of the invention. As but one example, if the multiple sensors 211-219 are interchanged in path position with the intermediate sensor 22, the sensors 211-219 need not be in a straight line perpendicular to the travelling direction but could be irregularly spaced, or could be staggered to provide an additional element of length detection.

Further, although the invention has been described in the context of a copying machine, it is not limited thereto but is applicable to any machine, especially document readers, which require a recirculating document path and may handle documents of different lengths.

What is claimed is:

1. An original conveying device comprising:
   means for conveying an original from an original inserting position to an exposure position;
   original length detecting means provided along an initial conveying path for detecting the length of said original along said path prior to said original being exposed for copying, wherein said original length detecting means is comprised of an original width detector constituted by a plurality of photo-sensors which are arranged on a line perpendicular to the direction of movement of an original, a plurality of photo-sensors for detecting the presence or absence of an original, and an original front edge detector;
   a plurality of conveying structures each having a relatively small path length and which are connectable in series to deliver said original to said exposure position repeatedly a predetermined number of times; and
   selection means for selectively connecting said conveying structures in series so that a shortest original circulating path is formed according to the detected length of said original.

2. A device as claimed in claim 1, wherein said original front edge detector comprises a plurality of photo-sensors which are arranged on a line perpendicular to the direction of movement of an original to thereby measure an inclination angle of said original.

3. A device as claimed in claim 1, wherein each of said conveying structures of small path length is provided with a finger adapted to open and close its respective path, said selection means selectively operating one of said fingers so that said original is conveyed to said exposure position again through said shortest original circulating path.

4. A device for conveying a document past a processing position, comprising:
   means for conveying said document from an inserting position to said processing position along a first path;
   document length detecting means provided along said first path for detecting the length of said document in the direction of said first path, wherein said document length detecting means also detects the width of said document in a direction substantially perpendicular to the direction of movement of said document along said first path and determines the length of said document at least partially in accordance with said detected width;
   means for conveying said document from said processing position to a discharge position along a second path;
   a plurality of deflection means each movable between a first position out of said second path and a second position in said second path whereby said document is deflected back into said first path; and
   means for selectively moving one of said deflection means into its second position in accordance with said detected document length.

5. A device as claimed in claim 4, wherein said document length detecting means comprises means for detecting the presence or absence of said document simultaneously at three spaced detection positions.

6. A device as claimed in claim 4, wherein all of said three detection positions are in said first path.

7. A device as claimed in claim 4, wherein said document length detecting means comprises sensing means at a first of said three detection positions for detecting said width of said document.

8. A device as claimed in claim 7, wherein said sensing means comprises a plurality of sensing elements for sensing the presence or absence of said document in different width regions of said first path.

9. A device as claimed in claim 7, wherein said plurality of sensing elements are arranged in a straight line substantially perpendicular to said direction of movement.

10. A device as claimed in claim 9, wherein said first detecting position is upstream of the other two of said three detection positions.

11. A device as claimed in claim 4, further comprising correction means for correcting the orientation of said document.

12. A device as claimed in claim 11, wherein said document length detecting means includes sensing means disposed at plural positions along said first path, and wherein the sensing means at one of said positions comprises a plurality of sensing elements for detecting a front edge of said document at different lateral positions of said first path.

13. A device as claimed in claim 11 or 12, wherein said correction means is disposed downstream of said processing station.

* * * * *